US012134381B2

(12) United States Patent
Itazuri

(10) Patent No.: US 12,134,381 B2
(45) Date of Patent: Nov. 5, 2024

(54) DRIVER SUPPORT DEVICE

(71) Applicant: TOYOTA JIDOSHA KABUSHIKI KAISHA, Toyota (JP)

(72) Inventor: Kazuki Itazuri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 348 days.

(21) Appl. No.: 17/874,645

(22) Filed: Jul. 27, 2022

(65) Prior Publication Data
US 2023/0049874 A1    Feb. 16, 2023

(30) Foreign Application Priority Data

Aug. 16, 2021   (JP) ................. 2021-132341

(51) Int. Cl.
*B60W 30/12*      (2020.01)
*B60W 10/20*      (2006.01)
*B62D 15/02*      (2006.01)

(52) U.S. Cl.
CPC .......... *B60W 30/12* (2013.01); *B60W 10/20* (2013.01); *B62D 15/021* (2013.01); *B62D 15/025* (2013.01); *B60W 2510/202* (2013.01); *B60W 2540/18* (2013.01); *B60W 2540/223* (2020.02)

(58) Field of Classification Search
CPC ................ B60W 30/12; B60W 10/20; B60W 2510/202; B60W 2540/18; B60W 2540/223; B62D 15/021; B62D 15/025
USPC ........................................ 701/41, 42, 43, 44
See application file for complete search history.

(56) References Cited

FOREIGN PATENT DOCUMENTS

| JP | 2002-063697 A | 2/2002 |
| JP | 2010-100120 A | 5/2010 |
| JP | 2010-195088 A | 9/2010 |
| JP | 2020-157901 A | 10/2020 |

*Primary Examiner* — Hai H Huynh
(74) *Attorney, Agent, or Firm* — Sughrue Mion, PLLC

(57) ABSTRACT

A driver support device includes: a drive device configured to change a steering angle being an angle of a steered wheel of a vehicle by applying torque to a steering shaft coupled to a steering wheel of the vehicle; and a control unit. The control unit executes lane departure avoidance control controlling the drive device to change the steering angle to avoid departure of the vehicle from a traveling lane when a start condition is satisfied, and is configured to execute the lane departure avoidance control such that, when a holding position of the steering wheel by a driver does not meet a predetermined specific condition upon satisfaction of the start condition, a magnitude of a steering angular velocity being an amount of change in the steering angle per unit time is smaller than the magnitude when the holding position meets the specific condition upon satisfaction of the start condition.

8 Claims, 12 Drawing Sheets

ROTATION BY LANE DEPARTURE AVOIDANCE CONTROL

ADDITIONAL TURNING DUE TO OWN WEIGHT OF HAND

DRIVER SUPPORT DEVICE

CROSS-REFERENCE TO RELATED APPLICATION

This application claims priority to Japanese Patent Application No. 2021-132341 filed on Aug. 16, 2021, incorporated herein by reference in its entirety.

BACKGROUND

1. Technical Field

The present disclosure relates to a driver support device that executes lane departure avoidance control that changes a steering angle of a vehicle in order to avoid departure of the vehicle from a traveling lane in which the vehicle is traveling.

2. Description of Related Art

Conventionally, a driver support device that executes lane departure avoidance control has been known. For example, a driver support device (hereinafter referred to as a "conventional device") described in Japanese Unexamined Patent Application Publication No. 2010-100120 (JP 2010-100120 A) executes lane departure avoidance control that applies steering torque to a steering mechanism in accordance with input torque by a steering operation of a driver. With the above, when the driver intentionally drives the vehicle to depart from the lane, the steering torque can be reduced, and when the driver unintentionally drives the vehicle to depart from the lane, the steering torque can be increased.

SUMMARY

While the lane departure avoidance control is being executed, the steering torque is applied to a "steering shaft coupled to a steering wheel of a vehicle" in order to change the steering angle of the vehicle. Therefore, the steering wheel also rotates during the execution of the lane departure avoidance control.

Due to this rotation of the steering wheel, an unintended operation of the steering wheel by the driver may occur depending on the holding position of the steering wheel by the driver. For example, own weight of the hand of the driver holding the steering wheel may cause the steering wheel to be additionally turned. Further, the driver may be surprised at the rotation of the steering wheel by the lane departure avoidance control and perform an unintended operation of the steering wheel.

The present disclosure has been made to address the above-mentioned issues. That is, one of an object of the present disclosure is to provide a driver support device capable of reducing a possibility that an unintended operation of the steering wheel by the driver occurs due to the rotation of the steering wheel by the lane departure avoidance control.

A driver support device according to the present disclosure (hereinafter, also referred to as "a device of the present disclosure") includes: a drive device (34) configured to change a steering angle that is an angle of a steered wheel of a vehicle (VA) by applying torque to a steering shaft (US) coupled to a steering wheel (SW) provided in the vehicle; and a control unit (20, 30) configured to execute lane departure avoidance control that controls the drive device so as to change the steering angle to avoid departure of the vehicle from a traveling lane in which the vehicle is traveling when a predetermined start condition is satisfied.

The control unit is configured to execute the lane departure avoidance control (MapGytgt(T), step 660, step 665, step 1105, steps 1205 to 1225) such that, when a holding position indicating a position of a hand of a driver of the vehicle holding the steering wheel does not meet a predetermined specific condition ("No" in step 710) at a time when the start condition is satisfied, a magnitude of a steering angular velocity that is an amount of change in the steering angle per unit time is smaller than the magnitude when the holding position meets the specific condition ("Yes" in step 710) at the time when the start condition is satisfied.

With the above, when the holding position does not meet the specific condition, the magnitude of a rotation speed of the steering wheel by the lane departure avoidance control becomes smaller than that when the holding position meets the specific condition. Therefore, it is possible to reduce a possibility of additional turning and unintended operation of the steering wheel by the driver due to the rotation of the steering wheel by the lane departure avoidance control can be reduced.

In one aspect of the device of the present disclosure, the control unit is configured to prolong an execution time of the lane departure avoidance control by advancing a timing at which the start condition is satisfied when the holding position does not meet the specific condition, compared to when the holding position meets the specific condition (step 665 and step 670).

According to this aspect, when the holding position does not meet the specific condition, the execution time of the lane departure avoidance control is prolonged by starting the lane departure avoidance control at an earlier timing than that when the holding position meets the specific condition. Therefore, even when the magnitude of the steering angular velocity when the holding position does not meet the specific condition is made smaller than that when the holding position meets the specific condition, the lane departure avoidance control can be executed.

In one aspect of the device of the present disclosure, the control unit is configured to determine that the start condition is satisfied when a width direction distance (Ds) in a width direction of the traveling lane from a predetermined reference point (P) of the vehicle to an avoidance position (PP) set in the width direction of the traveling lane matches a required distance (Dsn) that is a distance required for a lateral vehicle speed that is a vehicle speed in a vehicle width direction of the vehicle to become zero when a predetermined control time (Tc) elapses ("Yes" in step 650).

According to this aspect, it is possible to suppress the reference point from exceeding the avoidance position during the execution of the lane departure avoidance control.

In the above aspect, the control unit is configured to determine that the start condition is satisfied before the width direction distance matches the required distance ("Yes" in step 665) when the holding position does not meet the specific condition ("No" in step 645).

According to this aspect, when the holding position does not meet the specific condition, the execution time of the lane departure avoidance control is prolonged by starting the lane departure avoidance control at an earlier timing than that when the holding position meets the specific condition. Therefore, even when the magnitude of the steering angular velocity when the holding position does not meet the specific condition is made smaller than that when the holding position meets the specific condition, a possibility that the reference point exceeds the avoidance position during the execution of the lane departure avoidance control can be reduced, and further, a possibility that the lateral acceleration becomes zero when the reference point reaches the avoidance position can be increased.

In the above aspect, the control unit is configured to prolong the control time by setting the avoidance position at a position away by a predetermined distance in a direction opposite to a direction toward a center of the traveling lane in the width direction (step 1105) when the holding position does not meet the specific condition ("No" in step 645 shown in FIG. 6), compared to the control time when the holding position meets the specific condition.

According to this aspect, when the holding position does not meet the specific condition, the execution time of the lane departure avoidance control is prolonged by setting the avoidance position at a distant position, compared to the execution time when the holding position meets the specific condition. Therefore, even though the magnitude of the steering angular velocity when the holding position does not meet the specific condition is made smaller than that when the holding position meets the specific condition, a possibility that the reference point exceeds "the avoidance position set at the distant position" during the execution of the lane departure avoidance control can be reduced. Further, it is possible to increase the possibility that the lateral vehicle speed becomes zero when the reference point reaches this avoidance position.

In one aspect of the device of the present disclosure, the control unit is configured to, in an initial period from the time when the start condition is satisfied until when a predetermined time (Td) elapses, reduce a magnitude of the steering angular velocity when the holding position does not meet the specific condition at the time when the start condition is satisfied to be smaller than the magnitude of the steering angular velocity when the holding position is assumed to meet the specific condition at the time when the start condition is satisfied, and increase the magnitude of the steering angular velocity corresponding to reduction of the steering angular velocity in the initial period at and after a time when the initial period elapses from the time when the start condition is satisfied (lateral acceleration map MapGytgt(T) shown in FIG. 13).

The period immediately after the start of the lane departure avoidance control is the period in which additional turning and unintended operation of the steering wheel are most likely to occur. According to this aspect, when the holding position does not meet the specific condition, the magnitude of a rotation speed of the steering wheel by the lane departure avoidance control becomes smaller than that when the holding position meets the specific condition. With the above, the possibility of additional turning and unintended operation of the steering wheel can be reduced in the initial period.

In one aspect of the device of the present disclosure, the control unit is configured to control the drive device in the lane departure avoidance control such that a magnitude of the steering angular velocity does not become larger than a predetermined guard value, and execute (step 1220 and step 1225), when the holding position does not meet the specific condition ("No" in step 1205) at the time when the start condition is satisfied, the lane departure avoidance control using the guard value that is smaller than the guard value when the holding position meets the specific condition (step 1210) at the time when the start condition is satisfied.

When the holding position does not meet the specific condition, the guard value that is smaller than that when the holding position meets the specific condition is used, whereby the magnitude of the rotation speed of the steering wheel becomes smaller. With the above, the possibility of additional turning and unintended operation of the steering wheel can be reduced when the holding position does not meet the specific condition.

In one aspect of the device of the present disclosure, the control unit is configured to determine that the holding position meets the specific condition ("Yes" in step 710) when the driver holds the steering wheel by both hands and positions of the both hands of the driver holding the steering wheel are line-symmetrical with respect to a virtual reference line (BL) connecting a point directly on top and a point directly at a bottom when the steering wheel is positioned at a neutral position.

The additional turning and unintended operation of the steering wheel are more likely to occur when the driver holds the steering wheel by one hand and when the holding positions are not line-symmetrical with respect to the reference line even when the driver holds the steering wheel by both hands, compared to when the holding positions are line-symmetrical with respect to the reference line. According to this aspect, the control unit determines that the holding position does not meet the specific condition in the case above. Therefore, when the driver holds the steering wheel in a manner in which the possibility of additional turning and unintended operation becomes high, the lane departure avoidance control to reduce the magnitude of the steering angular velocity can be executed.

In the above description, in order to help understanding of the disclosure, the names and/or the reference signs used in the embodiment are added in parentheses to the configurations of the disclosure corresponding to the embodiment to be described later. However, respective components of the disclosure are not limited to the embodiment defined by the above names and/or reference signs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Structure

Figure 1:
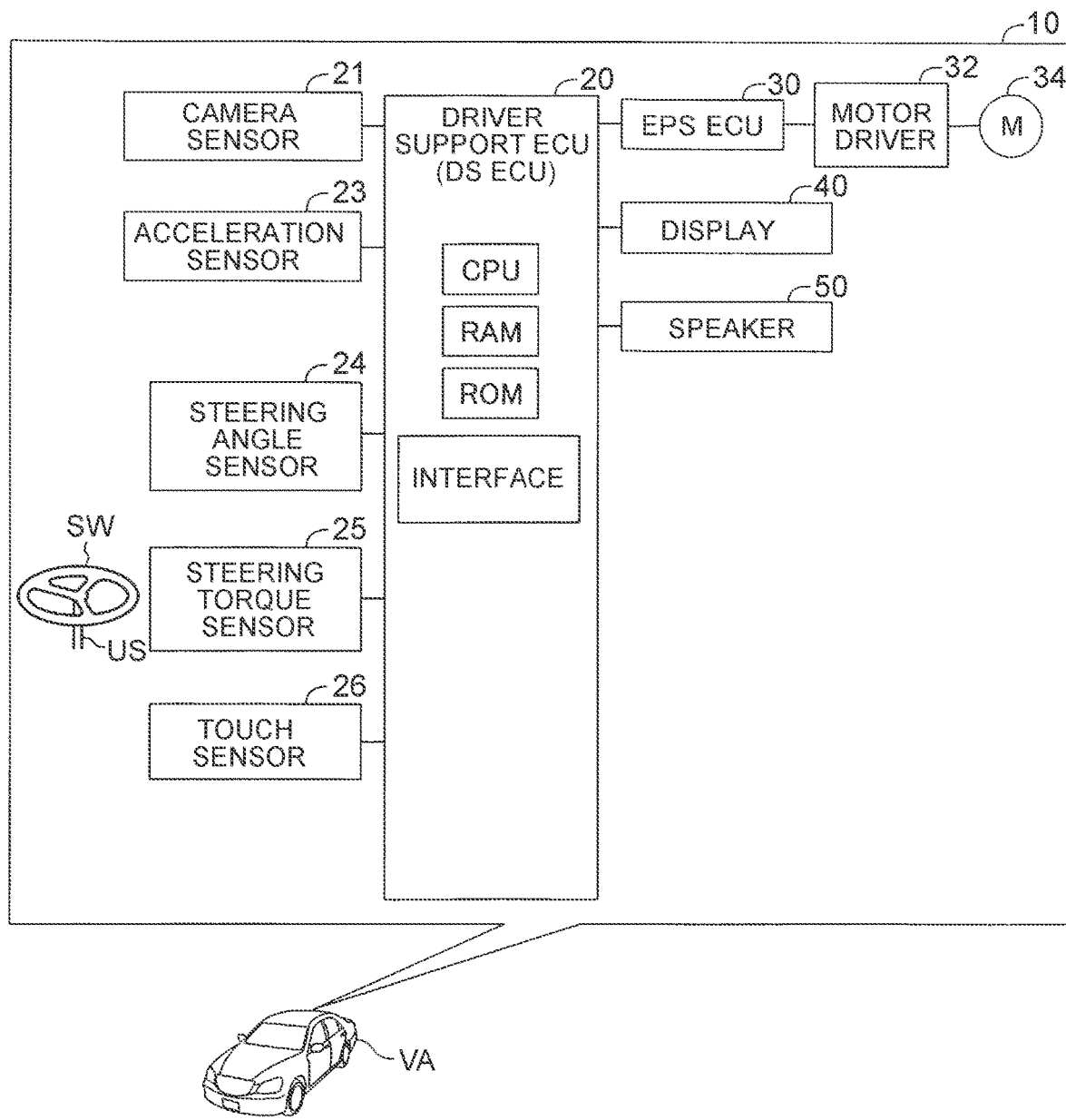
FIG. 1 is a schematic system configuration diagram of a driver support device according to an embodiment of the present disclosure.

As shown in FIG. 1, a driver support device (hereinafter, referred to as a "support device") 10 according to the embodiments of the present disclosure is mounted on a vehicle VA.

The support device 10 includes a driver support ECU 20 and an electric power steering ECU 30. The driver support ECU 20 is referred to as "DS ECU 20", and the electric power steering ECU 30 is referred to as "EPS ECU 30".

These ECUs are electric control units each including a microcomputer as a main unit, and are connected to each other so as to be able to transmit and receive information via a controller area network (CAN) (not shown). The microcomputer includes a central processing unit (CPU), read-only memory (ROM), random access memory (RAM), an interface (I/F), and the like. The CPU realizes various functions by executing instructions (", routines) stored in the ROM. Some or all of these ECUs may be integrated into one ECU. In addition, these ECUs may be referred to as a "control unit" or a "controller".

The support device 10 includes a camera sensor 21, an acceleration sensor 23, a steering angle sensor 24, a steering torque sensor 25, and a touch sensor 26. The above components are mounted on the vehicle VA. The DS ECU 20 is connected to the sensors and receives detection signals from the sensors. Note that, the sensors may be connected to an ECU other than the DS ECU 20. In this case, the DS ECU 20 receives the detection signal of the sensor from the ECU to which the sensor is connected via the CAN.

The camera sensor 21 acquires image data by capturing an image of the landscape in the area in front of the vehicle VA, and transmits the image data to the DS ECU 20. The DS ECU 20 recognizes a boundary line based on the image data. The boundary line is a line that serves as a boundary between "the lane in which the vehicle VA is currently traveling (hereinafter referred to as "traveling lane")" and "the area other than the traveling lane". Examples of the boundary line include a left white line LL (see FIGS. 2 and 3) and a right white line LR (see FIGS. 2 and 3) of the road.

The acceleration sensor 23 detects acceleration in a front-rear direction of the vehicle VA (hereinafter referred to as "front-rear acceleration") Gx and acceleration in a vehicle width direction of the vehicle VA (hereinafter referred to as "lateral acceleration") Gy, and generates detection signals indicating the front-rear acceleration Gx and the lateral acceleration Gy.

The steering angle sensor 24 detects a steering angle θ that is the rotation angle with respect to the neutral position of a steering wheel SW of the vehicle VA, and generates a detection signal indicating the steering angle θ. The steering torque sensor 25 is provided on a steering shaft US coupled to the steering wheel SW. The steering torque sensor 25 detects steering torque applied to the steering shaft US and generates a detection signal indicating the steering torque. The touch sensor 26 detects the position of the hand of the driver in contact with the steering wheel SW, and generates a detection signal indicating the position.

The EPS ECU 30 is a well-known control device for an electric power steering system. The EPS ECU 30 is connected to a motor driver 32.

The motor driver 32 is connected to a steering motor 34. The steering motor 34 may be referred to as a "drive device". The steering motor 34 is incorporated in a "steering mechanism including the steering wheel SW, the steering shaft US, a steering gear mechanism (not shown), and the like". The steering motor 34 is an electric motor (electric actuator), and torque (force) is applied to the steering shaft US by the electric power supplied from the motor driver 32. This torque is used as steering assist torque (steering assist force). With this torque, the right and left steered wheels of the vehicle VA can be steered. That is, the steering motor 34 can change the steering angle (also referred to as a steered angle) of the vehicle VA.

The EPS ECU 30 acquired steering torque Tra detected by the steering torque sensor 15 as the steering torque input by the driver to the steering wheel SW (hereinafter, also referred to as "driver torque TqDr") when the lane departure avoidance control to be described later is not executed. The EPS ECU 30 assists the driver in operating the steering wheel SW by causing the steering motor 34 to apply the driver torque TqDr to the steering shaft US.

Further, when the lane departure avoidance control to be described later is executed, the EPS ECU 30 receives a steering command including target lateral acceleration Gytgt acquired in the lane departure avoidance control from the DS ECU 20. The EPS ECU 30 acquires differential lateral acceleration ΔGy by subtracting the target lateral acceleration Gytgt from the current lateral acceleration Gy, and changes the steering angle by applying torque corresponding to the differential lateral acceleration ΔGt to the steering shaft US. With the EPS ECU 30, as an absolute value (|ΔGy|) of the differential lateral acceleration ΔGy becomes larger, the above torque increases, and the magnitude of the rotation speed of the steering wheel SW (that is, the amount of change in the steering angle per unit time) increases. The absolute value (|ΔGy|) of the differential lateral acceleration ΔGy increases as a magnitude of an inclination of the target lateral acceleration Gytgt of a lateral acceleration map MapGytgt(T) to be described later increases.

The display 40 displays a warning message indicating that the lane departure avoidance control is being executed and an operating status of the lane departure avoidance control. The display 40 may be a head-up display or a multifunction display. The speaker 50 emits a buzzer sound while the lane departure avoidance control is being executed.

Lane Departure Avoidance Control

The lane departure avoidance control will be described with reference to FIG. 2. The DS ECU 20 acquires the image data from the camera sensor 21 every time a predetermined time elapses, and recognizes the boundary lines (for example, the left white line LL and the right white line LR) of the traveling lane in which the vehicle VA is currently traveling. The DS ECU 20 acquires an avoidance position (avoidance line) PP by virtually moving the boundary line closest to the vehicle VA (hereinafter, referred to as "target boundary line") by a predetermined distance Dd. The lane departure avoidance control is executed such that a reference point P of the vehicle VA does not protrude outside the avoidance position PP. The reference point P is the center position between the right and left front wheels on the axle between the right and left front wheels of the vehicle VA.

The DS ECU 20 acquires the distance between the avoidance position PP and the current reference point P (hereinafter, referred to as "side distance Ds"). The side distance Ds may be referred to as a "width direction distance". The DS ECU 20 acquires a current lateral vehicle speed Vsy that is a vehicle speed Vs in the vehicle width direction by applying time integration to the current lateral acceleration Gy.

The DS ECU 20 acquires lateral acceleration Gy (hereinafter referred to as "required lateral acceleration Gyn") required for the lateral vehicle speed Vsy to become zero when a predetermined control time Tc elapses from the current time based on the current lateral vehicle speed Vsy Then, under the assumption that the vehicle VA moves in the front-rear direction while maintaining "a front-rear vehicle speed Vsx that is the current vehicle speed Vs in the front-rear direction" and moves in the vehicle width direction at the required lateral acceleration Gyn, the DS ECU 20 acquires the distance in which the vehicle VA moves in the width direction of the traveling lane during the period from the current time until the control time Tc elapses as a required side distance Dsn. In other words, the required side distance Dsn can also be expressed as a side distance Ds required for the lateral vehicle speed Vsy to become zero when the predetermined control time Tc elapses from the current time.

When the current side distance Ds is equal to or less than the required side distance Dsn, the DS ECU 20 determines that the predetermined start condition is satisfied, and starts the lane departure avoidance control. In the example shown in FIG. 2, the start condition is not satisfied because the side distance Ds is larger than the required side distance Dsn at a time point t0. At the time point t1, the side distance Ds becomes equal to or less than the required side distance Dsn, and the start condition is satisfied, whereby the lane departure avoidance control is started.

In the lane departure avoidance control, the DS ECU 20 transmits a steering command including the target lateral acceleration Gytgt to the EPS ECU 30 every time a predetermined time elapses.

When the DS ECU 20 starts the lane departure avoidance control, the DS ECU 20 generates the lateral acceleration map MapGytgt(T) (see the graph shown at the bottom in FIG. 2) that defines the relationship between the elapsed time from the start time of the lane departure avoidance control and the target lateral acceleration Gytgt. The DS ECU 20 acquires the target lateral acceleration Gytgt in accordance with the elapsed time by referring to the lateral acceleration map MapGytgt(T). For the target lateral acceleration Gytgt and the lateral acceleration Gy, acceleration in the right direction of the vehicle VA is set to a positive value, and acceleration in the left direction is set to a negative value. In the example shown in FIG. 2, the target lateral acceleration Gytgt becomes the acceleration in the left direction, that is, a negative value to make the vehicle speed Vsy in the right direction of the vehicle VA at the start time point (time point t1) zero.

Figure 2:
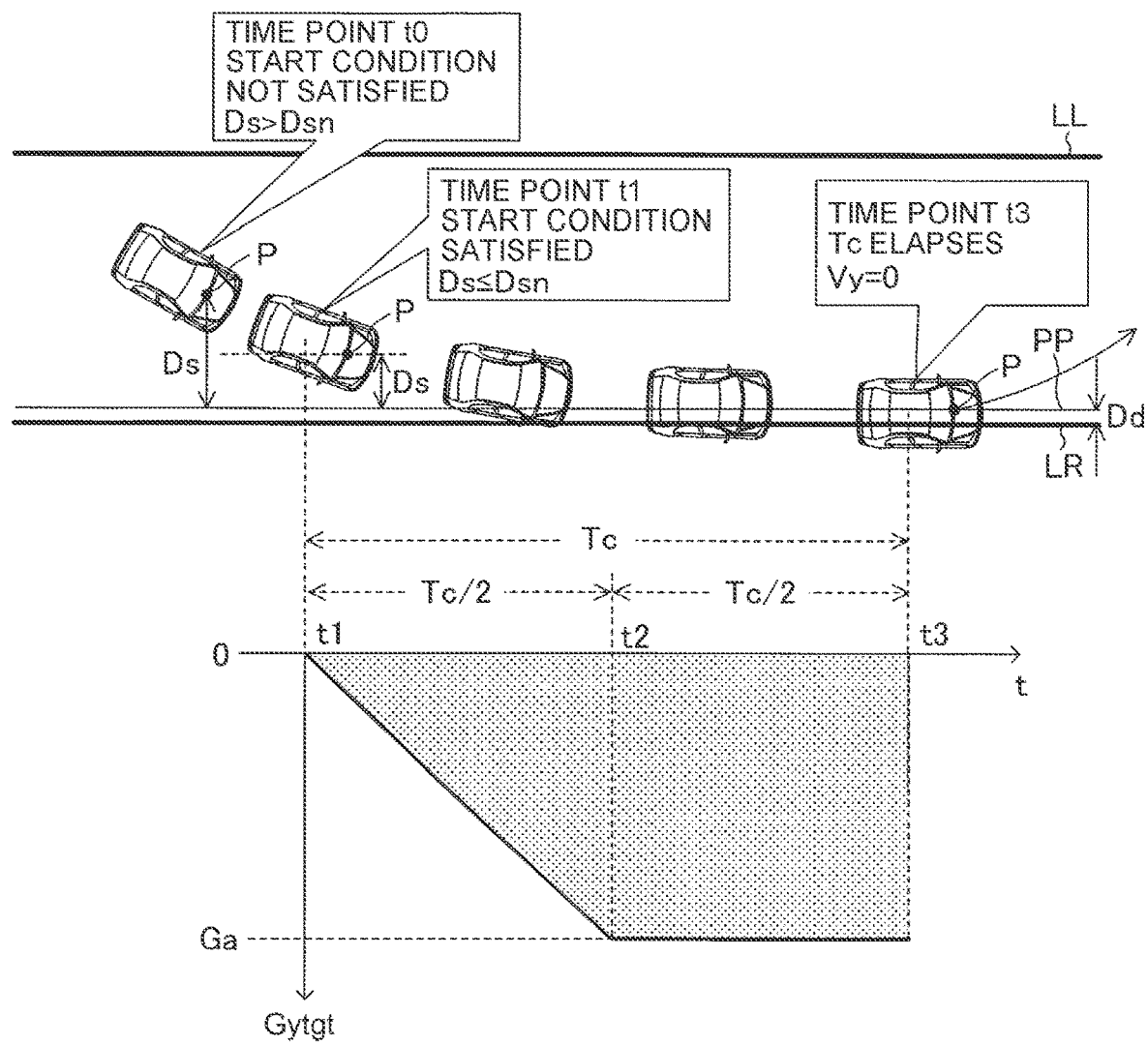
FIG. 2 is an explanatory diagram of lane departure avoidance control.

In the lateral acceleration MapGytgt (T) shown in FIG. 2, the target lateral acceleration Gytgt decreases in the period from the time point t1 to the time point t2 such that the target lateral acceleration Gytgt becomes a predetermined lateral acceleration Ga (Ga<0) at a time point t2 when the elapsed time becomes half of the control time Tc (Tc/2). Further, in the lateral acceleration MapGytgt (T) shown in FIG. 2, the lateral acceleration Gy is maintained at the predetermined lateral acceleration Ga during the period from the time point t2 to the time point t3.

The DS ECU 20 obtains the lateral acceleration Ga such that a value (integral value) obtained by integrating the target lateral acceleration Gytgt in the period from the time point t1 to the time point t3 (that is, the area of the solid portion in the graph shown in FIG. 2) matches "a value obtained by multiplying the control time Tc by the required lateral acceleration Gyn".

At the time point t3, the vehicle VA reaches the avoidance position PP and the lateral vehicle speed Vsy becomes zero. In the lane departure avoidance control after the time point t3, the DS ECU 20 transmits a steering command including the target lateral acceleration Gytgt for the vehicle VA to travel toward the center side in the width direction of the traveling lane. Then, the DS ECU 20 ends the lane departure avoidance control when an end side distance Des that is the distance between a predetermined end position and the reference point P becomes equal to or less than a threshold distance Dth after the time point t3. The end position is obtained by virtually moving the boundary line (target boundary line) closer to the vehicle VA toward the center of the traveling lane by a predetermined end distance De.

Outline of Operation

When the holding position that is the position of the hand of the driver holding the steering wheel SW does not meet a predetermined specific condition, the DS ECU 20 executes the lane departure avoidance control so as to reduce an amount of change in the target lateral acceleration Gytgt per unit hour, as compared to when the holding position meets the specific condition. With the above, an amount of change in the steering angle per unit time (that is, the magnitude of the rotation speed of the steering wheel SW) becomes small, and a possibility of additional turning and unintended operation of the steering wheel SW by the driver during the lane departure avoidance control can be reduced.

Figure 3:
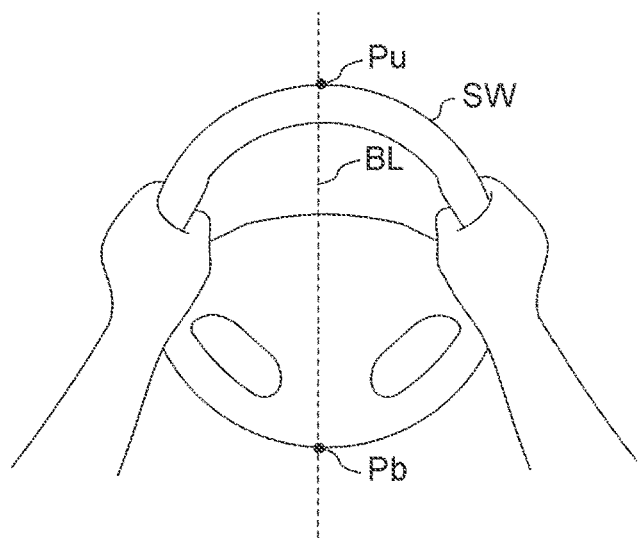
FIG. 3 is a front view of a steering wheel held so as to meet a specific condition.

The specific condition will be described with reference to FIG. 3. When the positions of both hands of the driver holding the steering wheel SW are line-symmetrical with respect to a reference line BL of the steering wheel SW, the DS ECU 20 determines that the holding positions meet the specific condition (that is, determines that the specific condition is satisfied). The reference line BL is a virtual line connecting a point Pu that is directly on top and a point Pb that is directly at the bottom when the steering wheel SW is in the neutral position. In the example shown in FIG. 3, the driver holds the steering wheel SW at the so-called "9:15" position, and the holding position is line-symmetrical with respect to the reference line BL. Therefore, the specific condition is met.

Figure 4A:
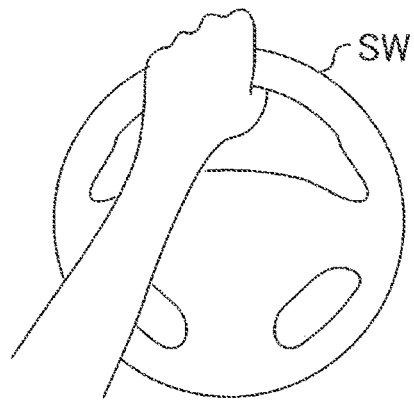
FIG. 4A is a front view of the steering wheel held by one hand.
Figure 4B:
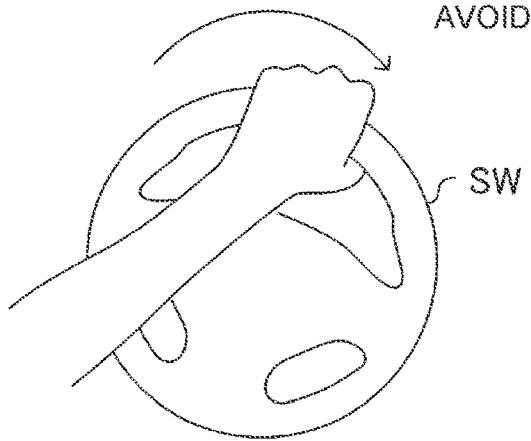
FIG. 4B is a front view of the steering wheel when the steering wheel starts to rotate by the lane departure avoidance control.
Figure 4C:
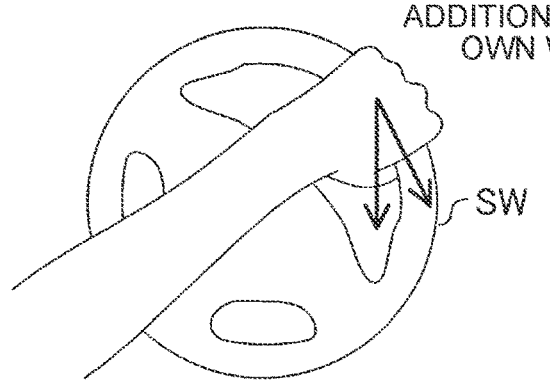
FIG. 4C is a front view of the steering wheel when additional turning occurs.

When the driver holds the upper portion of the steering wheel SW by one hand as shown in FIG. 4A, the above specific condition is not satisfied. When the lane departure avoidance control is executed under such a situation, the steering wheel SW rotates as shown in FIG. 4B. At this time, there is a possibility that additional turning of the steering wheel SW may occur due to the centrifugal force generated with the "hand holding the steering wheel SW" by rotation of the steering wheel SW.

In the present embodiment, when the specific condition is not satisfied, the amount of change in the steering angle is smaller than that when the specific condition is satisfied. Therefore, the magnitude of the rotation speed of the steering wheel SW becomes smaller. With the above, the above-mentioned centrifugal force can be reduced, and the possibility of additional turning of the steering wheel SW can be reduced. Further, according to the present embodiment, the possibility that the driver is surprised by the rotation of the steering wheel SW can be reduced, whereby the possibility of the unintended operation of the steering wheel by the driver can be reduced.

Operation Example

In FIG. 2, normal lane departure avoidance control (that is, when the above specific condition is satisfied) has been described. The lane departure avoidance control when the above specific condition is not satisfied will be described with reference to FIG. 5. When the specific condition is not satisfied, the DS ECU 20 determines that the start condition is satisfied when the side distance Ds is equal to or less than "a distance Dsn' obtained by adding a predetermined distance Dp1 to the required side distance Dsn", and starts the lane departure avoidance control. In the example shown in FIG. 5, it is assumed that the specific condition is not satisfied and the side distance Ds becomes equal to or less than the distance Dsn' at a time point t0. Based on this assumption, the start condition is satisfied at the time point t0, and the lane departure avoidance control is started.

At this time point t0, the DS ECU 20 generates the lateral acceleration map MapGytgt(T). Required acceleration Gyn' required until the vehicle speed Vsy (Vsy0) in the vehicle width direction at the time point t0 becomes zero when a required time Tn elapses from the time point t0 can be expressed using the above required time Tn (see Equation 1).

$$Gyn'=-Vsy0/Tn \quad \text{Equation 1}$$

Under the assumption that the vehicle VA moves in the front-rear direction while maintaining a vehicle speed Vsx0 in the front-rear direction at the time point t0 and moves in the vehicle width direction at the required acceleration Gyn', the DS ECU 20 obtains the required time (required time Tn) for "a distance in which the vehicle VA moves in the width direction of the traveling lane" matches the distance Dsn' (required time Tn). This required time Tn is longer than the control time Tc.

Then, the DS ECU 20 obtains lateral acceleration Ga' such that an integral value (the area of the solid portion in the graph shown in FIG. 5) obtained by integrating the target lateral acceleration Gytgt corresponding to the elapsed time by "a period from the start time until the required time Tn elapses" matches "the product of the required lateral acceleration Gyn and the control time Tc". The DS ECU 20 generates the lateral acceleration map MapGytgt(T) (see the graph in FIG. 5) based on the lateral acceleration Ga'.

Figure 5:
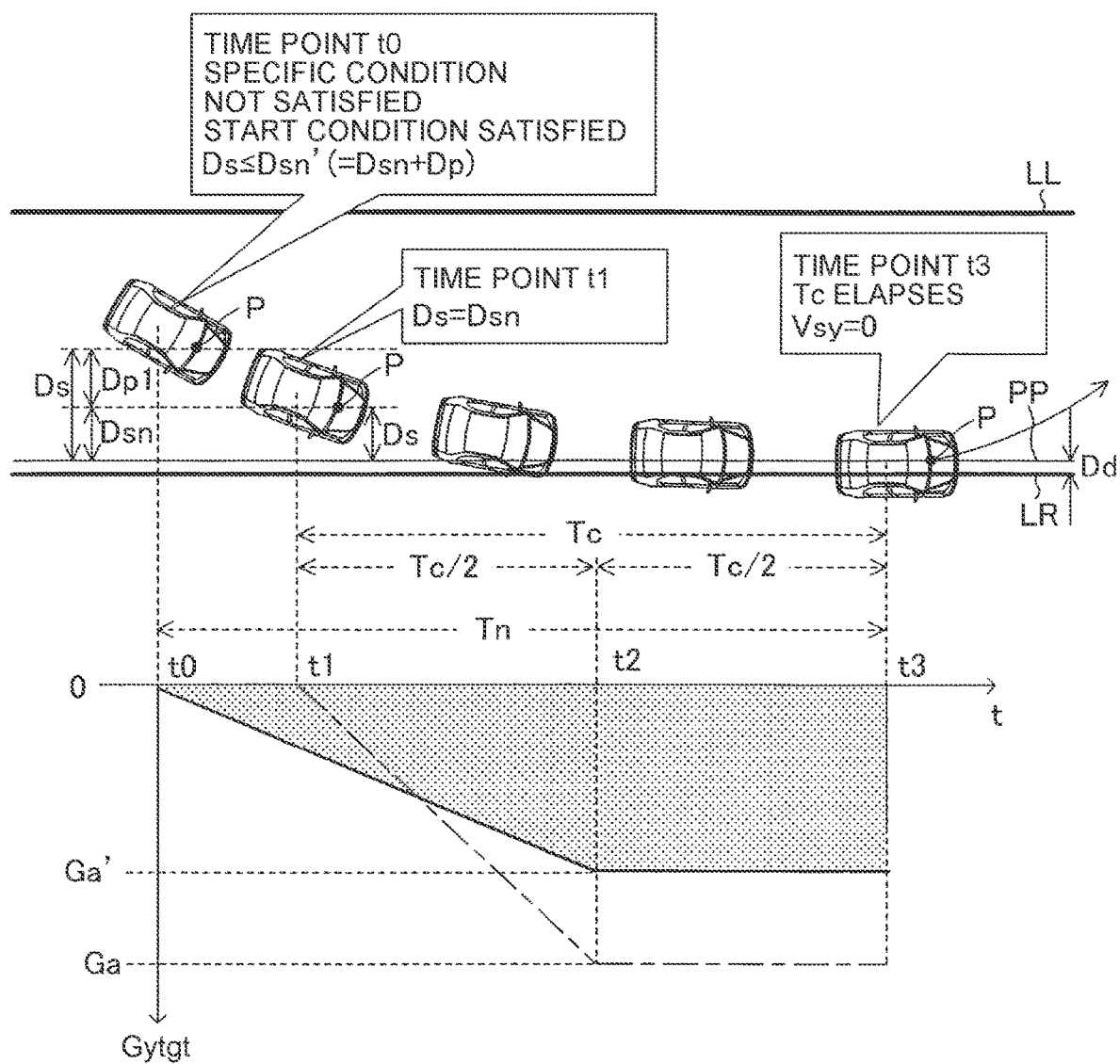
FIG. 5 is an explanatory diagram of an operation example of the lane departure avoidance control when the specific condition is not satisfied.

As can be understood from the graph in FIG. 5, an execution time (Tn) of the lane departure avoidance control when the specific condition is not satisfied is longer than an execution time (Tc) of the lane departure avoidance control when the specific condition is satisfied. The magnitude of an inclination gr of the target lateral acceleration Gytgt from the time point t0 to the time point t2 in the lane departure avoidance control when the specific condition is not satisfied is smaller than the magnitude of the inclination gr from the time point t1 to the time point t2 in the lane departure avoidance control when the specific condition is satisfied. Therefore, the magnitude of the rotation speed of the steering wheel SW by the lane departure avoidance control when the specific condition is not satisfied (that is, the magnitude of the steering angular velocity that is the amount of change in the steering angle of the steered wheels per unit time) can be made smaller than the magnitude of the rotation speed of the steering wheel SW when the specific condition is satisfied.

Specific Operation

Start Determination Routine

The CPU of the DS ECU 20 (hereinafter, "CPU" in the description refers to the CPU of the DS ECU 20 unless otherwise specified) executes a start determination routine shown by the flowchart in FIG. 6 every time a predetermined time elapses.

Figure 6:
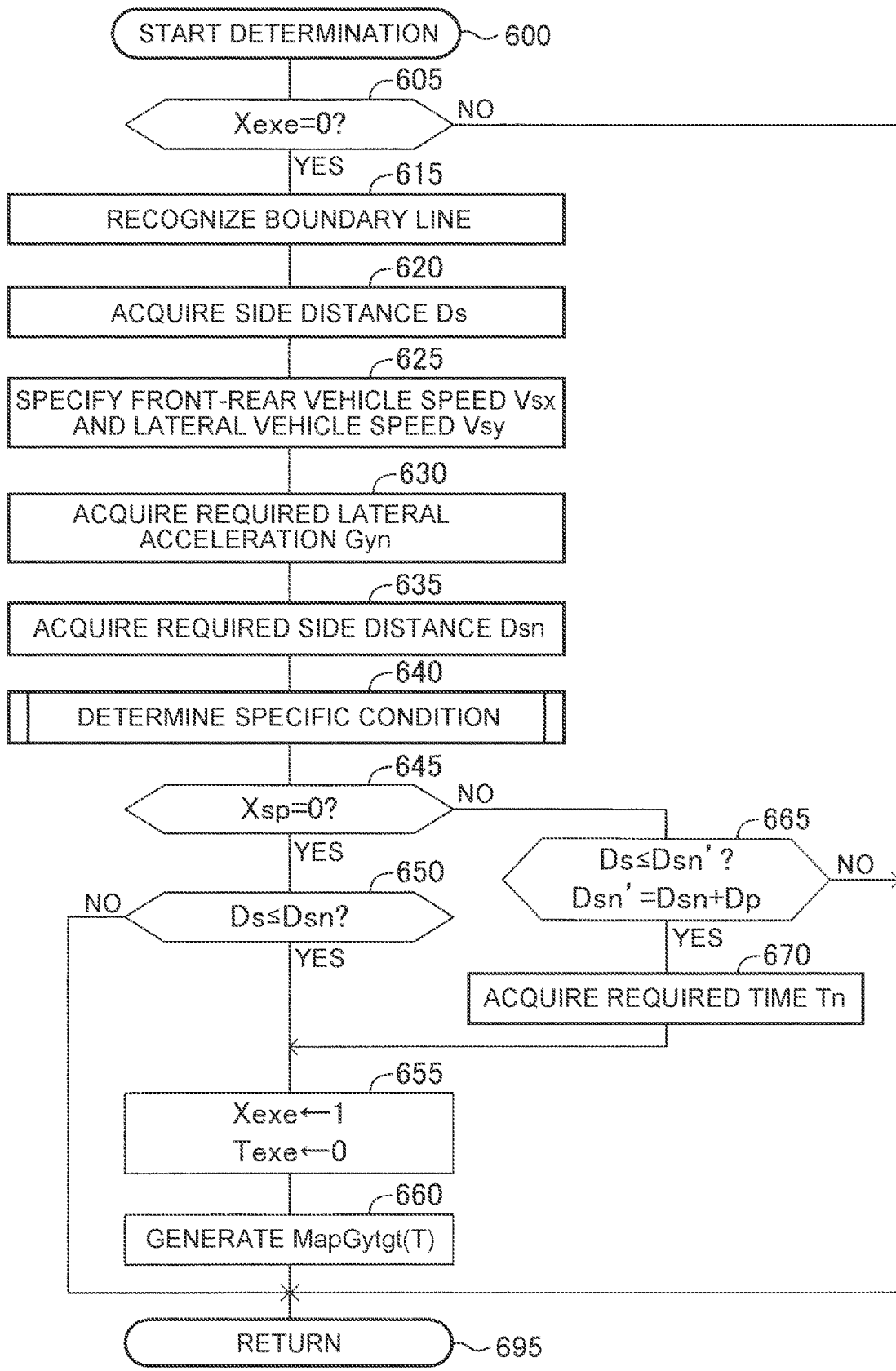
FIG. 6 is a flowchart showing a start determination routine executed by a central processing unit (CPU) of a driver support electronic control unit (ECU) shown in FIG. 1.

Therefore, at a predetermined timing, the CPU starts the process from step 600 shown in FIG. 6 and proceeds to step 605. In step 605, the CPU determines whether the value of an execution flag Xexe is "0".

The value of the execution flag Xexe is set to "1" when the lane departure avoidance control starts, and is set to "0" when the lane departure avoidance control ends. The value of the execution flag Xexe is also set to "0" in the initial routine. The initial routine is a routine executed by the CPU when an ignition key switch (not shown) of the vehicle VA is changed from the off position to the on position.

When the value of the execution flag Xexe is "0", the CPU determines "Yes" in step 605, and executes steps 615 to 645 sequentially.

Step 615: The CPU acquires image data from the camera sensor 21 and recognizes the boundary line based on the image data.

Step 620: The CPU acquires the side distance Ds between the reference point P and the avoidance position PP.

Step 625: The CPU specifies the front-rear acceleration Gx of the vehicle VA based on the detection signal from the acceleration sensor 23, and acquires the front-rear vehicle speed Vsx that is the vehicle speed in the front-rear direction of the vehicle VA by applying time integration to front-rear acceleration Gx. Further, the CPU specifies the lateral acceleration Gy of the vehicle VA based on the detection signal from the acceleration sensor 23, and acquires the lateral vehicle speed Vsy by applying time integration to the lateral acceleration Gy.

Step 630: The CPU acquires the required lateral acceleration Gyn based on the lateral vehicle speed Vsy and the control time Tc.

Step 635: Under the assumption that the vehicle VA moves in the front-rear direction while maintaining the front-rear vehicle speed Vsx in the front-rear direction and moves in the vehicle width direction at the required lateral acceleration Gyn, the CPU acquires the required side distance Dsn that is the distance in which the vehicle VA moves in the width direction of the traveling lane during the period from the current time until the control time Tc elapses.

Step 640: The CPU executes a specific condition determination subroutine. Actually, when the CPU proceeds to step 640, the CPU executes the subroutine shown by the flowchart in FIG. 7. In this subroutine, the CPU sets the value of a specific flag Xsp to "0" when the holding position meets the specific condition, and sets the value of the specific flag Xsp to "1" when the holding position does not meet the specific condition. Note that, the value of the specific flag Xsp is set to "1" in the initial routine.

Step 645: The CPU determines whether the value of the specific flag Xsp is "0". When the value of the specific flag Xsp is "0", the CPU determines "Yes" in step 645 and proceeds to step 650.

In step 650, the CPU determines whether the side distance Ds is equal to or less than the required side distance Dsn. When the side distance Ds is larger than the required side distance Dsn, the CPU determines "No" in step 650, proceeds to step 695, and temporarily ends this routine. On the other hand, when the side distance Ds is equal to or less than the required side distance Dsn, the CPU determines "Yes" in step 650, and executes steps 655 and 660 sequentially.

Step 655: The CPU sets the value of the execution flag Xexe to "1" and the value of an execution timer Texe to "0".

The execution timer Texe is a timer for counting the elapsed time from the start time of the lane departure avoidance control.

Step 660: The CPU generates the lateral acceleration map MapGytgt(T). After that, the CPU proceeds to step 695 and temporarily ends this routine.

On the other hand, when the value of the specific flag Xsp is "1" when the CPU proceeds to step 645, the CPU determines "No" in step 645 and proceeds to step 665.

In step 665, the CPU determines whether the side distance Ds is equal to or less than the required side distance Dsn'. When the side distance Ds is larger than the required side distance Dsn', the CPU determines "No" in step 665, proceeds to step 695, and temporarily ends this routine.

On the other hand, when the side distance Ds is equal to or less than the distance Dsn', the CPU determines "Yes" in step 665 and proceeds to step 670. In step 670, the CPU acquires the required acceleration Gyn' and the required time Tn. After that, the CPU proceeds to step 655 to generate the lateral acceleration map MapGytgt(T), and proceeds to step 695 to temporarily end this routine.

In the case where the value of the execution flag Xexe is "1" when the CPU proceeds to step 605, the CPU determines "No" in step 605, proceeds to step 695, and temporarily ends this routine.

Specific Condition Determination Subroutine

Figure 7:
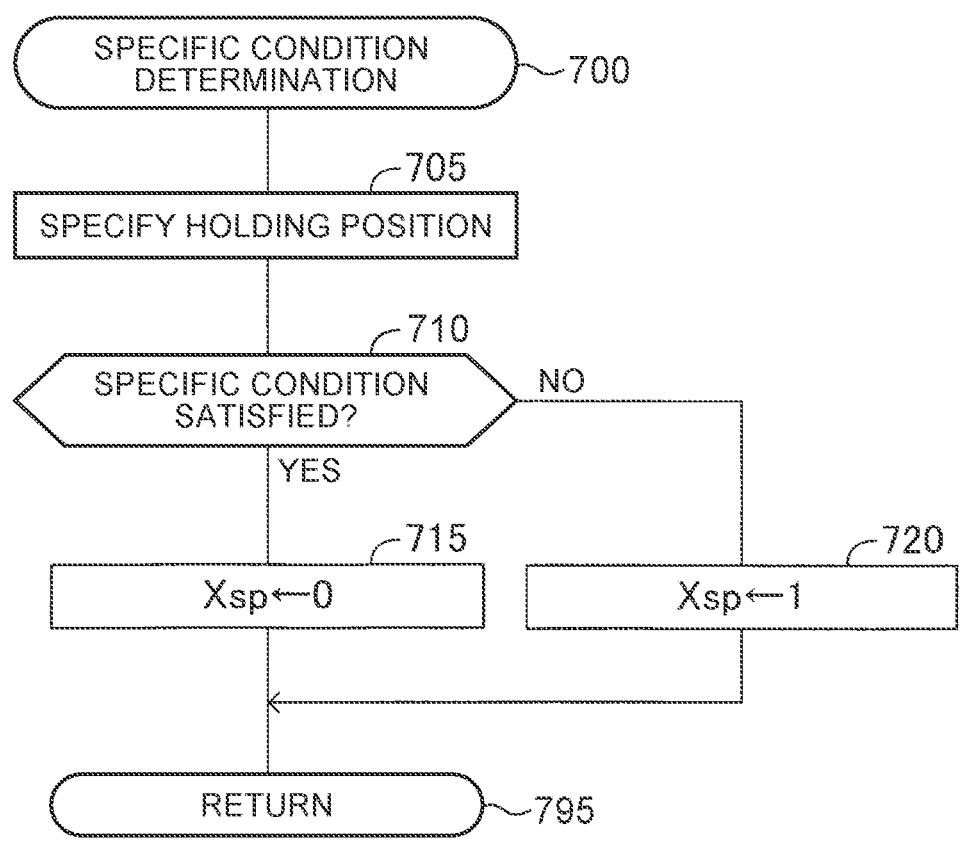
FIG. 7 is a flowchart showing a specific condition determination subroutine executed by the CPU of the driver support ECU shown in FIG. 1.

When the CPU proceeds to step 640 shown in FIG. 6, the CPU starts the process from step 700 shown in FIG. 7, and executes steps 705 and 710 sequentially.

Step 705: The CPU specifies the position (holding position) of the hand of the driver holding the steering wheel SW based on the detection signal from the touch sensor 26.

Step 710: The CPU determines whether the holding position meets the specific condition.

When the holding position meets the specific condition, the CPU determines "Yes" in step 710 and proceeds to step 715. In step 715, the CPU sets the value of the specific flag Xsp to "0". After that, the CPU proceeds to step 795, temporarily ends this routine, and proceeds to step 645 shown in FIG. 6.

On the other hand, when the holding position does not meet the specific condition, the CPU determines "No" in step 710 and proceeds to step 720. In step 720, the CPU sets the value of the specific flag Xsp to "1". After that, the CPU proceeds to step 795, temporarily ends this routine, and proceeds to step 645 shown in FIG. 6.

Lane Departure Avoidance Control Routine

Figure 8:
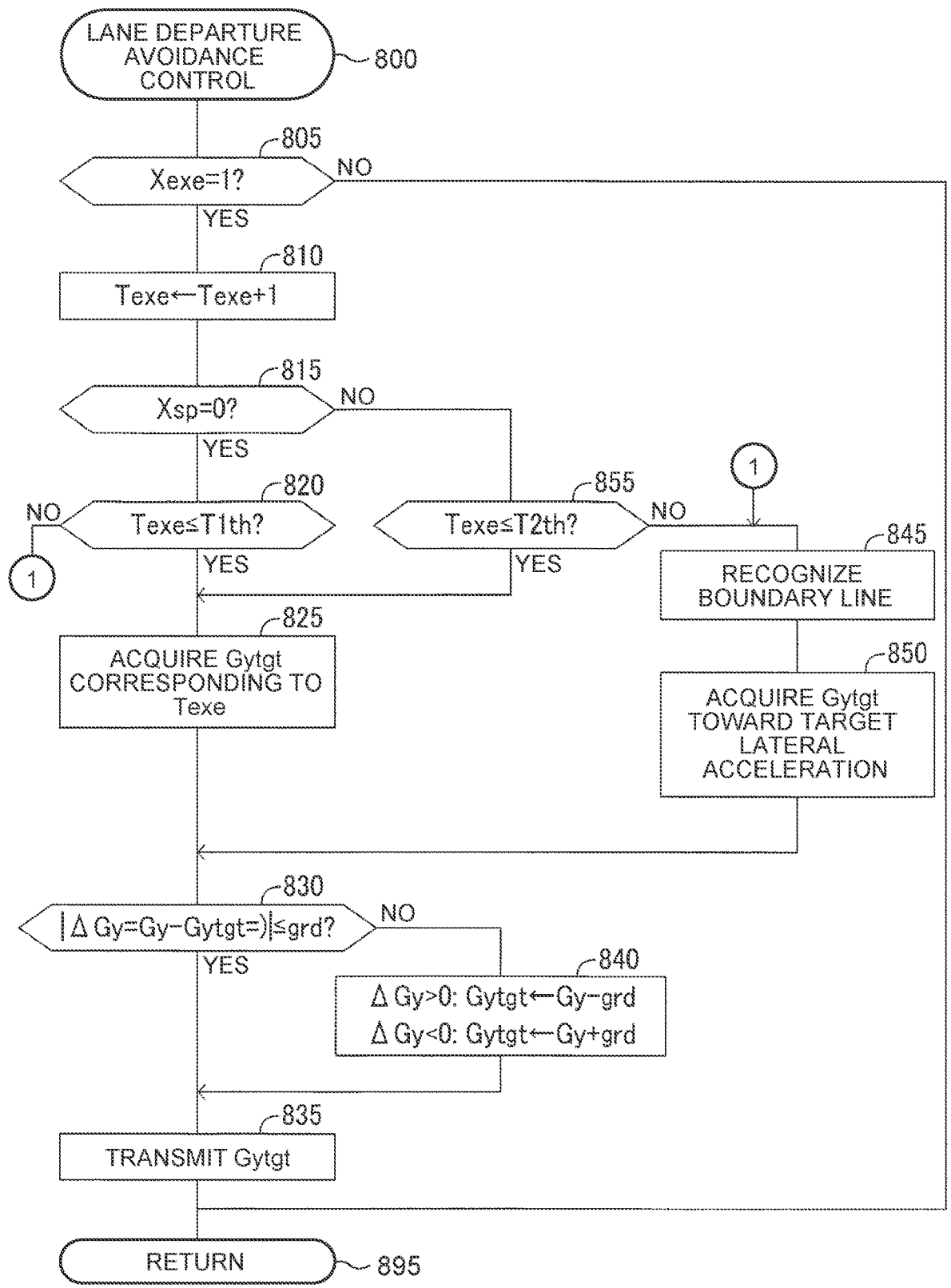
FIG. 8 is a flowchart showing a lane departure avoidance control routine executed by the CPU of the driver support ECU shown in FIG. 1.

The CPU executes the lane departure avoidance control routine shown by the flowchart in FIG. 8 every time a predetermined time elapses.

Therefore, at a predetermined timing, the CPU starts the process from step 800 shown in FIG. 8 and proceeds to step 805. In step 805, the CPU determines whether the value of the execution flag Xexe is "1".

When the value of the execution flag Xexe is "0", the CPU determines "No" in step 805, proceeds to step 895, and temporarily ends this routine.

On the other hand, when the value of the execution flag Xexe is "1", the CPU determines "Yes" in step 805, and executes steps 810 to 815 sequentially.

Step 810: The CPU adds "1" to the execution timer Texe.
Step 815: The CPU determines whether the value of the specific flag Xsp is "0".

When the value of the specific flag Xsp is "0", the CPU determines "Yes" in step 815 and proceeds to step 820. In step 820, the CPU determines whether the value of the execution timer Texe is equal to or less than a first time threshold value T1th. The first time threshold value T1th is set to a value such that the elapsed time from the start time of the lane departure avoidance control becomes the control time Tc when the execution timer Texe becomes the first time threshold value T1th.

When the value of the execution timer Texe is equal to or less than the first time threshold value T1th, the CPU determines "Yes" in step 820, and executes steps 825 and 830 sequentially.

Step 825: The CPU acquires the target lateral acceleration Gytgt by applying the value of the execution timer Texe to the lateral acceleration map MapGytgt(T).

Step 830: The CPU determines whether the absolute value (|ΔGy|) of the differential lateral acceleration ΔGy is equal to or less than a predetermined guard value grd. The differential lateral acceleration ΔGy is obtained by subtracting the target lateral acceleration Gytgt from the current lateral acceleration Gy.

When the absolute value (|ΔGy|) is equal to or less than the guard value grd, the CPU determines "Yes" in step 830 and proceeds to step 835. In step 835, the CPU transmits a steering command including the target lateral acceleration Gytgt to the EPS ECU 30. After that, the CPU proceeds to step 895 and temporarily ends this routine.

On the other hand, when the absolute value (|ΔGy|) is equal to or less than the guard value grd, the CPU determines "No" in step 830 and proceeds to step 840. In step 840, the CPU sets the target lateral acceleration Gytgt such that the absolute value (|ΔGy|) is equal to or less than the guard value grd. When the differential lateral acceleration ΔGy is a positive value, the CPU sets the target lateral acceleration Gytgt as a value obtained by subtracting the guard value grd from the lateral acceleration Gy. When the differential lateral acceleration ΔGy is a negative value, the CPU sets the target lateral acceleration Gytgt as a value obtained by adding the guard value grd to the lateral acceleration Gy. After that, the CPU transmits a steering command to the EPS ECU 30 in step 835, proceeds to step 895, and temporarily ends this routine.

In the case where the value of the execution timer Texe is larger than the first time threshold value T1th when the CPU proceeds to step 820, the CPU determines "No" in step 820, and executes steps 845 and 850 sequentially.

Step 845: The CPU acquires the image data from the camera sensor 21 and recognizes the boundary line based on the image data.
Step 850: The CPU identifies a traveling lane based on the boundary line, and acquires the target lateral acceleration Gytgt for traveling the vehicle VA toward the center in the width direction of the traveling lane.

After that, the CPU proceeds to step 830.

On the other hand, in the case where the value of the specific flag Xsp is "1" when the CPU proceeds to step 815, the CPU determines "No" in step 815 and proceeds to step 855. In step 855, the CPU determines whether the value of the execution timer Texe is equal to or less than a second time threshold value T2th. The second time threshold value T2th is set to a value such that the elapsed time from the start time of the lane departure avoidance control becomes the required time Tn when the execution timer Texe becomes the second time threshold value T2th.

When the value of the execution timer Texe is equal to or less than the second time threshold value T2th, the CPU determines "Yes" in step 855, proceeds to step 825, and acquires the target lateral acceleration Gytgt corresponding to the value of the execution timer Texe. After that, the CPU proceeds to step 830.

On the other hand, when the value of the execution timer Texe is larger than the second time threshold value T2th, the CPU determines "No" in step 855 and proceeds to step 845.

End Determination Routine

Figure 9:
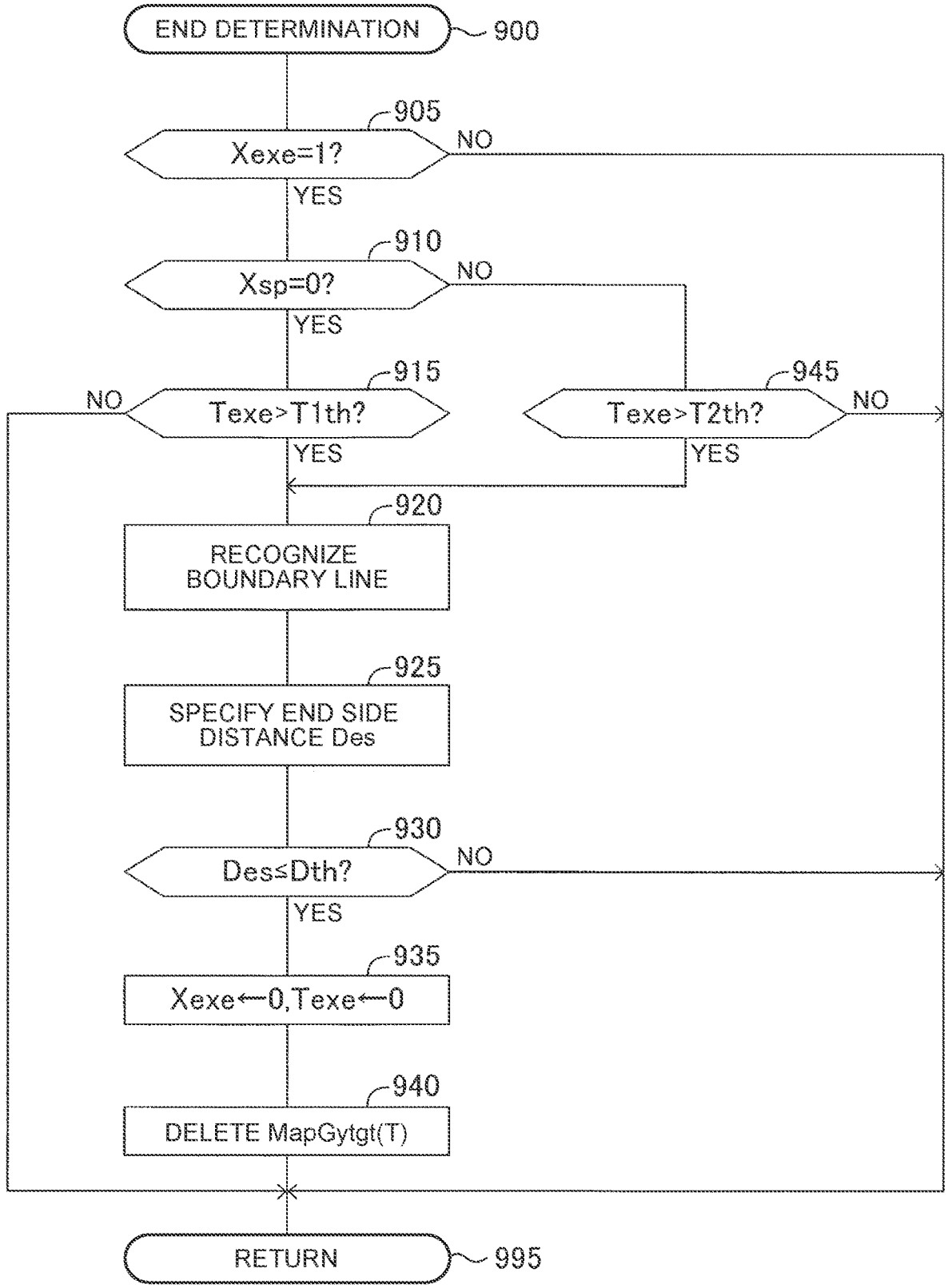
FIG. 9 is a flowchart showing an end determination routine executed by the CPU of the driver support ECU shown in FIG. 1.

The CPU executes an end determination routine shown by the flowchart in FIG. 9 every time a predetermined time elapses.

Therefore, at a predetermined timing, the CPU starts the process from step 900 shown in FIG. 9 and proceeds to step 905. In step 905, the CPU determines whether the value of the execution flag Xexe is "1".

When the value of the execution flag Xexe is "0", the CPU determines "No" in step 905, proceeds to step 995, and temporarily ends this routine. On the other hand, when the value of the execution flag Xexe is "1", the CPU determines "Yes" in step 905 and proceeds to step 910. In step 910, the CPU determines whether the value of the specific flag Xsp is "0".

When the value of the specific flag Xsp is "0", the CPU determines "Yes" in step 910 and proceeds to step 915. In step 915, the CPU determines whether the value of the execution timer Texe is equal to larger than the first time threshold value T1th.

When the value of the execution timer Texe is less than the first time threshold value T1th, the CPU determines "No" in step 915, proceeds to step 995, and temporarily ends this routine. On the other hand, when the value of the execution timer Texe is larger than the first time threshold value T1th, the CPU determines "Yes" in step 915, and executes steps 920 to 930 sequentially.

Step 920: The CPU acquires the image data from the camera sensor 21 and recognizes the boundary line based on the image data.
Step 925: The CPU specifies the end side distance Des based on the boundary line.
Step 930: The CPU determines whether the end side distance Des is equal to or less than the threshold distance Dth.

When the end side distance Des is larger than the threshold distance Dth, the CPU determines "No" in step 930, proceeds to step 995, and temporarily ends this routine. On the other hand, when the end side distance Des is equal to or less than the threshold distance Dth, the CPU determines "Yes" in step 930, and executes steps 935 and 940 sequentially.

Step 935: The CPU sets the values of the execution flag Xexe and the execution timer Texe to "0".
Step 940: The CPU deletes the lateral acceleration map MapGytgt(T).
After that, the CPU proceeds to step 995 and temporarily ends this routine.

When the specific condition is not satisfied, the support device 10 starts the lane departure avoidance control at an earlier timing than that when the specific condition is satisfied, thereby prolonging the execution time of the lane departure avoidance control. With the above, the amount of change (inclination) in the target lateral acceleration Gytgt per unit time when the specific condition is not satisfied can be made smaller than that when the specific condition is satisfied. Therefore, the magnitude of the rotation speed of the steering wheel SW (the magnitude of the steering angular velocity) when the specific condition is not satisfied can be made smaller than that when the specific condition is satisfied. Accordingly, it is possible to reduce the possibility of additional turning of the steering wheel SW, and it is also possible to reduce the possibility of the unintended operation of the steering wheel by the driver.

The present disclosure is not limited to the above embodiment, and various modifications can be adopted within the scope of the present disclosure.

First Modification

Figure 10:
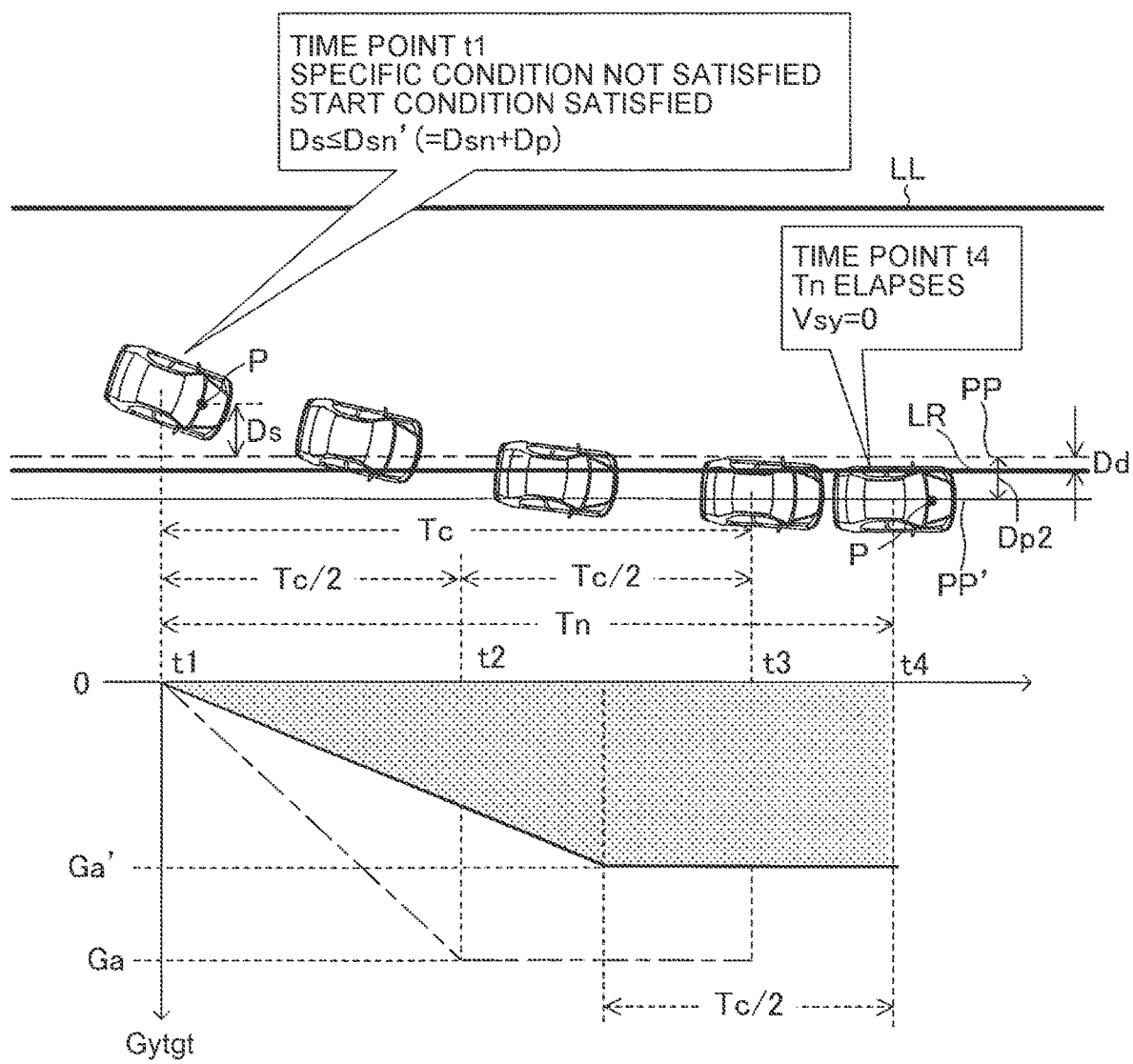
FIG. 10 is an explanatory diagram of an operation example of the lane departure avoidance control according to a first modification of the embodiment of the present disclosure.

The outline of the present modification will be described with reference to FIG. 10. The DS ECU 20 starts the lane departure avoidance control when the side distance Ds becomes the required side distance Dsn or less (see the time point t1). In this case, when the specific condition is not satisfied, the DS ECU 20 acquires a new avoidance position PP' by virtually moving the avoidance position PP by a predetermined distance Dp2 in the direction opposite to the direction toward the center in the width direction of the traveling lane (downward in the drawing).

The DS ECU 20 obtains the required time Tn as in the description of the operation example of the above embodiment. The required time Tn is longer than the control time Tc. Next, the DS ECU 20 obtains the lateral acceleration Ga' as in the description of the operation example of the above embodiment, and generates the lateral acceleration map MapGytgt(T) (see the graph in FIG. 10) based on the lateral acceleration Ga'. Note that, in the lateral acceleration map MapGytgt(T) shown in FIG. 10, the target acceleration Gytgt decreases to the lateral acceleration Ga' in the period from the start time t1 until a predetermined time (Tn−Tc/2) elapses. The target acceleration Gytgt is then maintained at the lateral acceleration Ga' in the period from the time when the predetermined time (Tn−Tc/2) elapses to the time point t4.

In the lane departure avoidance control when the specific condition is not satisfied, the reference point P of the vehicle VA reaches the avoidance position PP' and the lateral vehicle speed Vsy becomes zero at the time point t4 when the required time Tn elapses from the start time point t1.

According to the present modification, when the specific condition is not satisfied, the execution time (required time Tn) of the lane departure avoidance control is longer than that when the specific condition is satisfied using the avoidance position PP' instead of the avoidance position PP. With the above, the magnitude of the rotation speed of the steering wheel SW by the lane departure avoidance control (that is, the magnitude of the steering angular velocity) when the specific condition is not satisfied can be made smaller than the magnitude of the rotation speed of the steering wheel SW (the magnitude of the steering angular speed) when the specific condition is satisfied.

Figure 11:
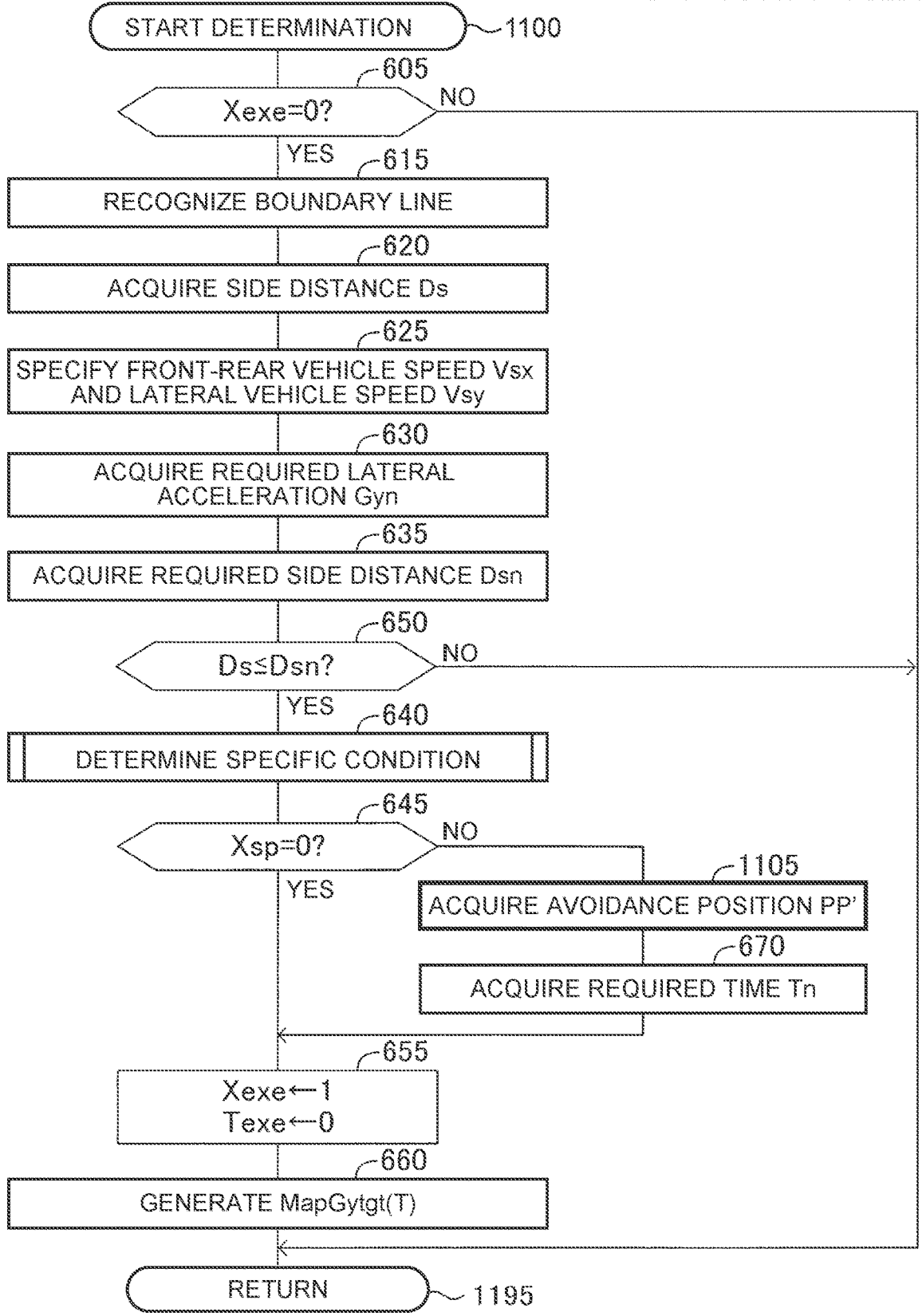
FIG. 11 is a flowchart showing a start determination routine according to the first modification of the embodiment of the present disclosure.

The CPU of the DS ECU 20 according to the present modification executes the start determination routine shown in FIG. 11 every time a predetermined time elapses instead of the start determination routine shown in FIG. 6, and executes the routines shown in FIGS. 7 to 9 every time the predetermined time elapses. In FIG. 11, the same reference symbols as those used in FIG. 6 are assigned to the steps in which the same processing as in the steps shown in FIG. 6 is executed, and the description thereof will be omitted.

At a predetermined timing, the CPU starts the process from step 1100 shown in FIG. 11 and proceeds to step 605 shown in FIG. 11. When the value of the execution flag Xexe is "0", the CPU determines "Yes" in step 605 shown in FIG. 11, executes steps 615 to 635 shown in FIG. 11 sequentially, and proceeds to step 650 shown in FIG. 11. When the side distance Ds is larger than the required side distance Dsn, the CPU determines "No" in step 650 shown in FIG. 11, proceeds to step 1195, and temporarily ends this routine. When the side distance Ds is equal to or less than the required side distance Dsn, the CPU determines "Yes" in step 650 shown in FIG. 11, and executes steps 640 and 645 shown in FIG. 11 sequentially.

When the value of the specific flag Xsp is "0", the CPU determines "Yes" in step 645 shown in FIG. 11, executes steps 655 and 660 shown in FIG. 11 sequentially, proceeds to step 1195, and temporarily ends this routine.

When the value of the specific flag Xsp is "1", the CPU determines "No" in step 645 shown in FIG. 11 and proceeds to step 1105. In step 1105, the CPU acquires the avoidance position PP', proceeds to step 670 shown in FIG. 11, and acquires the required time Tn. After that, the CPU executes step 655 and step 660 shown in FIG. 11 sequentially, proceeds to step 1195, and temporarily ends this routine.

Second Modification

When the specific condition is not satisfied at the start time of the lane departure avoidance control, the DS ECU 20 according to the present modification uses a second guard value grd2 that is smaller than the first guard value grd1 used in the lane departure avoidance control when the specific condition is satisfied. With the above, in the lane departure avoidance control when the specific condition is not satisfied, the absolute value ($|\Delta Gy|$) of the differential lateral acceleration $\Delta Gy$ does not become larger than the second guard value grd2. Therefore, the magnitude of the rotation speed of the steering wheel SW in the lane departure avoidance control (that is, the magnitude of the steering angular velocity) when the specific condition is not satisfied can be made smaller than the magnitude of the rotation speed of the steering wheel SW in the lane departure avoidance control (the magnitude of the steering angular speed) when the specific condition is satisfied.

Figure 12:
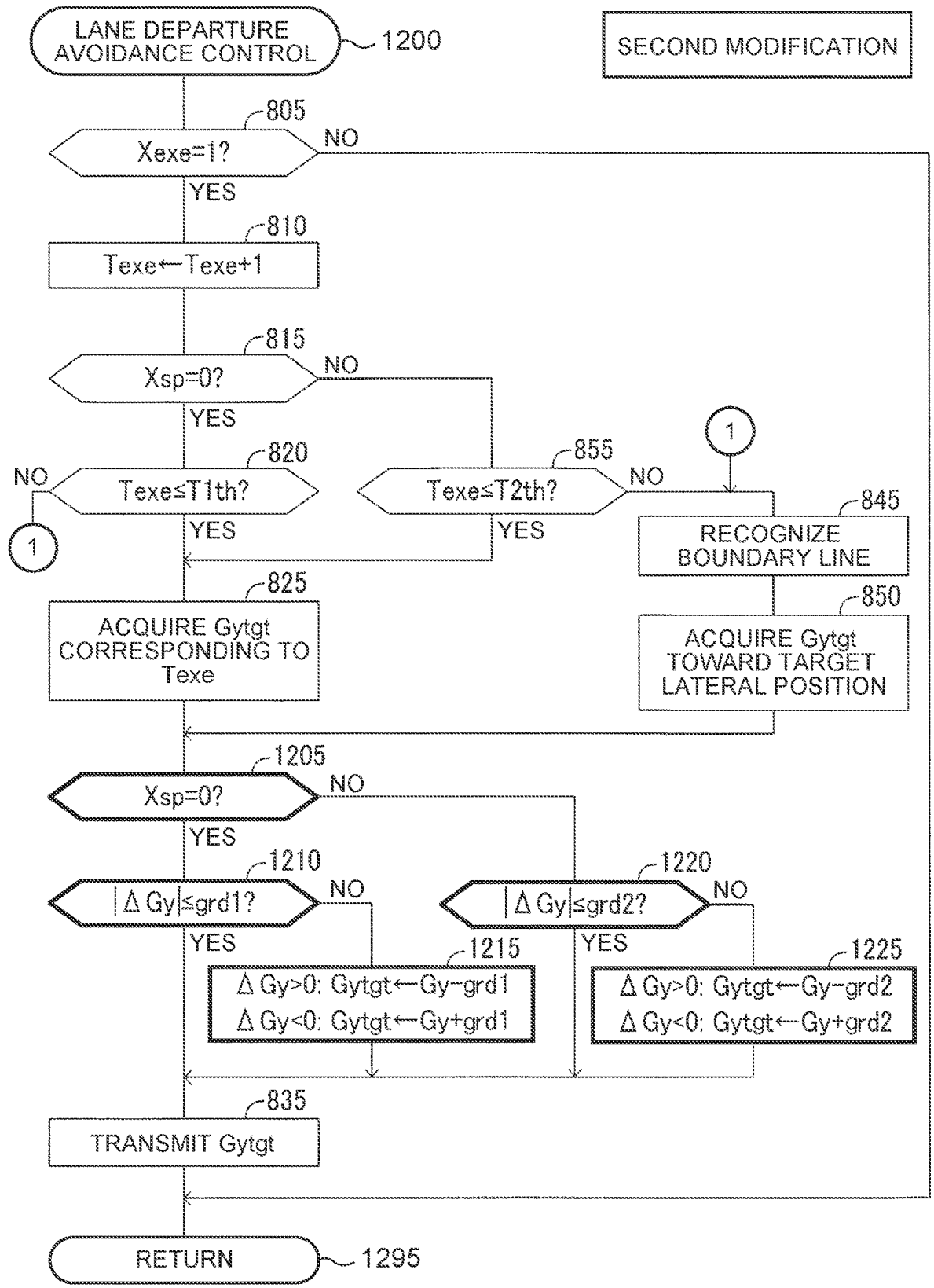
FIG. 12 is a flowchart showing a lane departure avoidance control routine according to a second modification of the embodiment of the present disclosure.

The CPU of the DS ECU 20 according to the present modification executes a "start determination routine in which step 645, step 1105, and step 670 are deleted from the start determination routine shown in FIG. 11" every time a predetermined time elapses. Further, the CPU executes a lane departure avoidance control routine shown in FIG. 12 every time the predetermined time elapses. In FIG. 12, the same reference symbols as those used in FIG. 8 are assigned to the steps in which the same processing as in the steps shown in FIG. 8 is executed, and the description thereof will be omitted. The CPU executes the routines shown in FIGS. 7 and 9 every time a predetermined time elapses.

At a predetermined timing, the CPU starts the process from step 1200 shown in FIG. 12 and proceeds to step 805 shown in FIG. 12. When the value of the execution flag Xexe is "0", the CPU determines "No" in step 805 shown in FIG. 12, proceeds to step 1295, and temporarily ends this routine.

When the value of the execution flag Xexe is "1", the CPU determines "Yes" in step 805 shown in FIG. 12, and executes steps 810 to 815 shown in FIG. 12 sequentially. When the value of the specific flag Xsp is "0", the CPU determines "Yes" in step 815 shown in FIG. 12 and proceeds to step 820 shown in FIG. 12.

When the value of the execution timer Texe is equal to or less than the first time threshold value T1th, the CPU determines "Yes" in step 820 shown in FIG. 12, executes steps 825 shown in FIG. 12, and proceeds to step 1205.

In step 1205, the CPU determines whether the value of the specific flag Xsp is "0". When the value of the specific flag Xsp is "0", the CPU determines "Yes" in step 1205 and proceeds to step 1210. In step 1210, the CPU determines whether the absolute value ($|\Delta Gy|$) of the differential lateral acceleration $\Delta Gy$ is equal to or less than the first guard value grd1.

When the absolute value ($|\Delta Gy|$) is equal to or less than the first guard value grd1, the CPU determines "Yes" in step 1210, proceeds to step 835 shown in FIG. 12, and transmits a steering command. After that, the CPU proceeds to step 1295 and temporarily ends this routine.

On the other hand, when the absolute value ($|\Delta Gy|$) is larger than the first guard value grd1, the CPU determines "No" in step 1210 and proceeds to step 1215. In step 1215, the CPU sets the target lateral acceleration Gytgt such that the absolute value ($|\Delta Gy|$) is equal to or less than the first guard value grd1 and proceeds to step 835 shown in FIG. 12. The details of setting the target lateral acceleration Gytgt are the same as those in step 840 shown in FIG. 8, the description thereof will be omitted.

In the case where the value of the specific flag Xsp is "1" when the CPU proceeds to step 1205, the CPU determines "No" in step 1205 and proceeds to step 1220. In step 1220, the CPU determines whether the absolute value (AGO is equal to or less than the predetermined second guard value grd2. Note that the second guard value grd2 is preset to a value smaller than the first guard value grd1.

When the absolute value ($|\Delta Gy|$) is equal to or less than the second guard value grd2, the CPU determines "Yes" in step 1220 and proceeds to step 835 shown in FIG. 12. On the other hand, when the absolute value ($|\Delta Gy|$) is larger than the second guard value grd2, the CPU determines "No" in step 1220 and proceeds to step 1225. In step 1225, the CPU sets the target lateral acceleration Gytgt such that the absolute value ($|\Delta Gy|$) is equal to or less than the second guard value grd2 and proceeds to step 835 shown in FIG. 12.

As can be understood from the above, in the lane departure avoidance control when the specific condition is not satisfied, the second guard value grd2 smaller than the first guard value grd1 is used. This makes it possible to suppress the magnitude of the rotational speed of the steering wheel SW (the magnitude of the steering angular velocity) from becoming larger than the value corresponding to the second guard value grd2. Therefore, the magnitude of the rotation speed of the steering wheel SW of the lane departure avoidance control (that is, the magnitude of the steering angular velocity) when the specific condition is not satisfied can be made smaller than the magnitude of the rotation speed of the steering wheel SW of the lane departure avoidance control (the magnitude of the steering angular speed) when the specific condition is satisfied.

Third Modification

Figure 13:
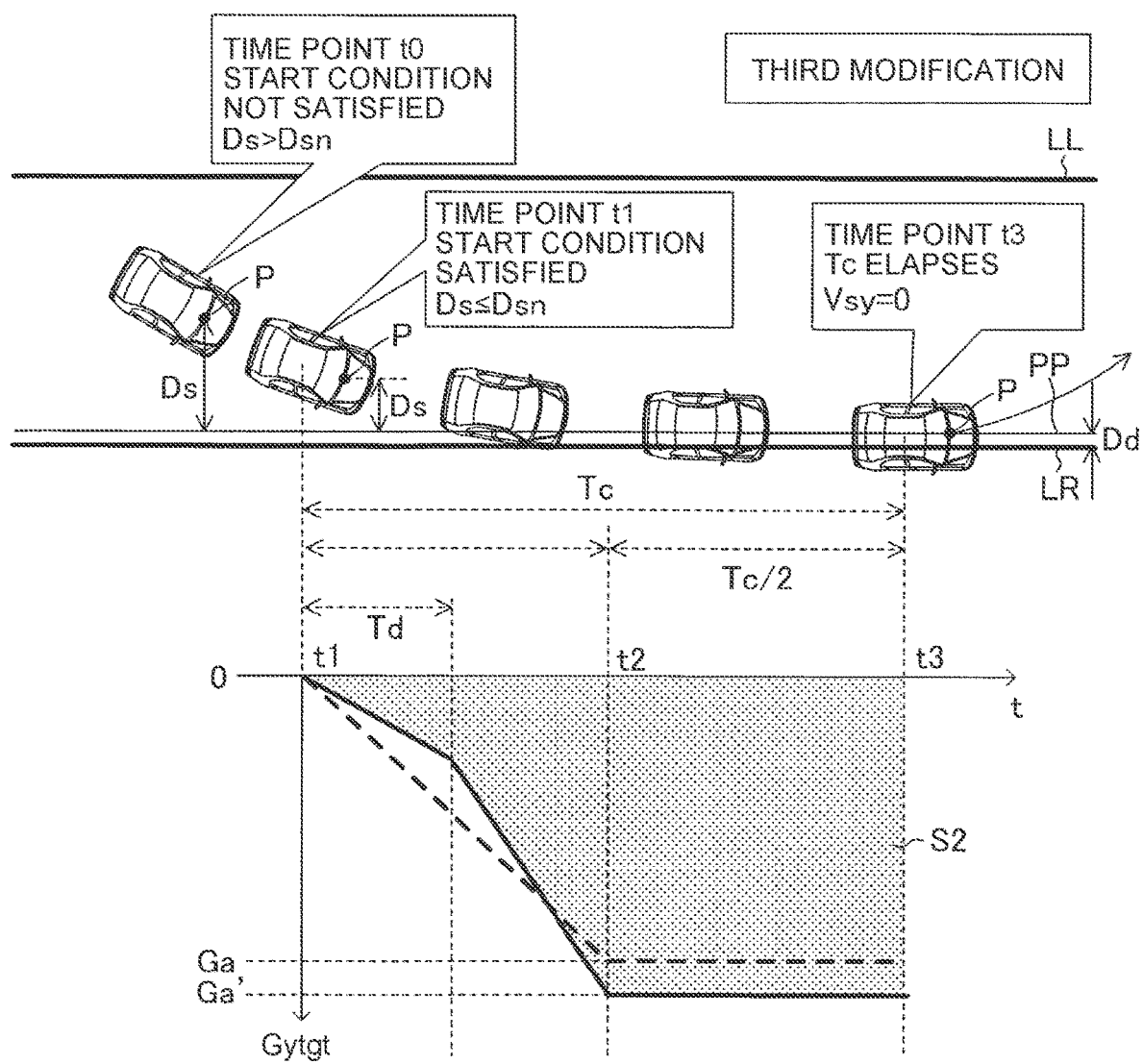
FIG. 13 is an explanatory diagram of an operation example of the lane departure avoidance control according to a third modification of the embodiment of the present disclosure.

A third modification will be described with reference to FIG. 13. When the specific condition is not satisfied at the start time (time point t1) of the lane departure avoidance control, the DS ECU 20 according to the present modification makes the magnitude of the inclination of the target lateral acceleration Gytgt smaller than "the magnitude of the inclination of the target lateral acceleration Gytgt shown by the dotted line in FIG. 13 when it is assumed that the specific condition is satisfied at the start time (time point t1)" in the initial period from the start time until a predetermined time Td (<Tc/2). With the above, the magnitude of the rotation speed of the steering wheel SW (the magnitude of the steering angular velocity) of the lane departure avoidance control when the specific condition is not satisfied can be made smaller than that when the specific condition is satisfied.

The DS ECU 20 obtains the lateral acceleration Ga' at and after the time point t2 such that the "integral value obtained by integrating the target lateral acceleration Gytgt when the specific condition is not satisfied with the control time Tc (the area of the solid portion in the graph shown in FIG. 13)" matches "the value obtained by integrating the target lateral acceleration Gytgt when it is assumed that the specific condition is satisfied with the control time Tc (integral value)". The magnitude of the lateral acceleration Ga' becomes larger corresponding to the amount by which the magnitude of the inclination of the target lateral acceleration Gytgt is reduced in the initial period, and as a matter of course, the magnitude of the lateral acceleration Ga' becomes larger than the lateral acceleration Ga when it is assumed that the specific condition is satisfied.

The steering wheel SW starts to rotate when the lane departure avoidance control is started. Therefore, the above-mentioned additional turning and unintentional operation are more likely to occur immediately after the start of the lane departure avoidance control. According to the present modification, the magnitude of the inclination of the target lateral acceleration Gytgt in the above initial period when the specific condition is not satisfied is smaller than the magnitude of the inclination of the target lateral acceleration Gytgt when it is assumed that the specific condition is satisfied. With the above, the magnitude of the rotation speed of the steering wheel SW in the initial period when the specific condition is not satisfied can be made smaller than the magnitude of the rotation speed of the steering wheel SW when the specific condition is satisfied.

As described above, the lateral acceleration Ga' is obtained such that the integral value when the specific condition is not satisfied matches the integral value when the specific condition is satisfied. Therefore, the lateral vehicle speed Vsy becomes reliably zero at the time point t3 when the control time Tc elapses from the start time point (time point t1).

Fourth Modification

In the above embodiment, the holding position of the steering wheel SW of the driver is detected by the touch sensor 26, but detection of the holding position is not limited to this. For example, the vehicle VA is provided with a driver seat camera for capturing an image of the driver seat, and the DS ECU 20 may detect the holding position based on the image captured by the driver seat camera.

Fifth Modification

The support device 10 is used also for a hybrid electric vehicle (HEV), a plug-in hybrid electric vehicle (PHEV), a fuel cell electric vehicle (FCEV), and a battery electric vehicle (BEV), in addition to the engine vehicle described above.

What is claimed is:

1. A driver support device comprising:
a drive device configured to change a steering angle that is an angle of a steered wheel of a vehicle by applying torque to a steering shaft coupled to a steering wheel provided in the vehicle; and
a control unit configured to execute lane departure avoidance control that controls the drive device so as to change the steering angle to avoid departure of the vehicle from a traveling lane in which the vehicle is traveling when a predetermined start condition is satisfied, wherein the control unit is configured to execute the lane departure avoidance control such that, when a holding position indicating a position of a hand of a driver of the vehicle holding the steering wheel does not meet a predetermined specific condition at a time when the start condition is satisfied, a magnitude of a steering angular velocity that is an amount of change in the steering angle per unit time is smaller than the magnitude when the holding position meets the specific condition at the time when the start condition is satisfied.

2. The driver support device according to claim 1, wherein the control unit is configured to prolong an execution time of the lane departure avoidance control by advancing a timing at which the start condition is satisfied when the holding position does not meet the specific condition, compared to when the holding position meets the specific condition.

3. The driver support device according to claim 1, wherein the control unit is configured to determine that the start condition is satisfied when a width direction distance in a width direction of the traveling lane from a predetermined reference point of the vehicle to an avoidance position set in the width direction of the traveling lane matches a required distance that is a distance required for a lateral vehicle speed that is a vehicle speed in a vehicle width direction of the vehicle to become zero when a predetermined control time elapses.

4. The driver support device according to claim 3, wherein the control unit is configured to determine that the start condition is satisfied before the width direction distance matches the required distance when the holding position does not meet the specific condition.

5. The driver support device according to claim 3, wherein the control unit is configured to prolong the control time by setting the avoidance position at a position away by a predetermined distance in a direction opposite to a direction toward a center of the traveling lane in the width direction when the holding position does not meet the specific condition, compared to the control time when the holding position meets the specific condition.

6. The driver support device according to claim 1, wherein the control unit is configured to, in an initial period from the time when the start condition is satisfied until when a predetermined time elapses, reduce a magnitude of the steering angular velocity when the holding position does not meet the specific condition at the time when the start condition is satisfied to be smaller than the magnitude of the steering angular velocity when the holding position is assumed to meet the specific condition at the time when the start condition is satisfied, and increase the magnitude of the steering angular velocity corresponding to reduction of the steering angular velocity in the initial period at and after a time when the initial period elapses from the time when the start condition is satisfied.

7. The driver support device according to claim 1, wherein the control unit is configured to:
control the drive device in the lane departure avoidance control such that a magnitude of the steering angular velocity does not become larger than a predetermined guard value; and execute, when the holding position does not meet the specific condition at the time when the start condition is satisfied, the lane departure avoidance control using the guard value that is smaller than the guard value when the holding position meets the specific condition at the time when the start condition is satisfied.

8. The driver support device according to claim 1, wherein the control unit is configured to determine that the holding position meets the specific condition when the driver holds the steering wheel by both hands and positions of the both hands of the driver holding the steering wheel are line-symmetrical with respect to a virtual reference line connecting a point directly on top and a point directly at a bottom when the steering wheel is positioned at a neutral position.

* * * * *